May 9, 1961     B. B. BAUER ET AL     2,983,516
HIGH FIDELITY TRANSCRIPTION TONE ARM

Filed Feb. 5, 1958     6 Sheets-Sheet 1

Inventors
Benjamin B. Bauer,
Charles Ernest Seeler
and Lee Gunter, Jr.
By Jones, Darby & Roberton
Attys.

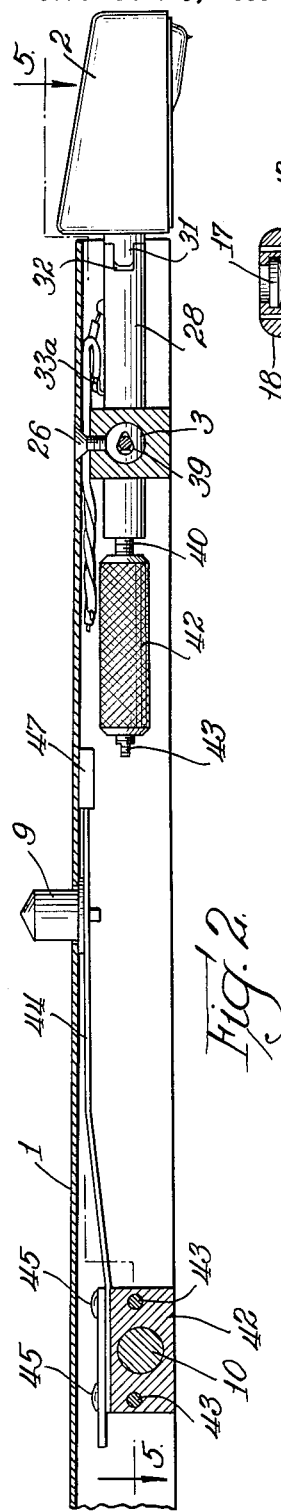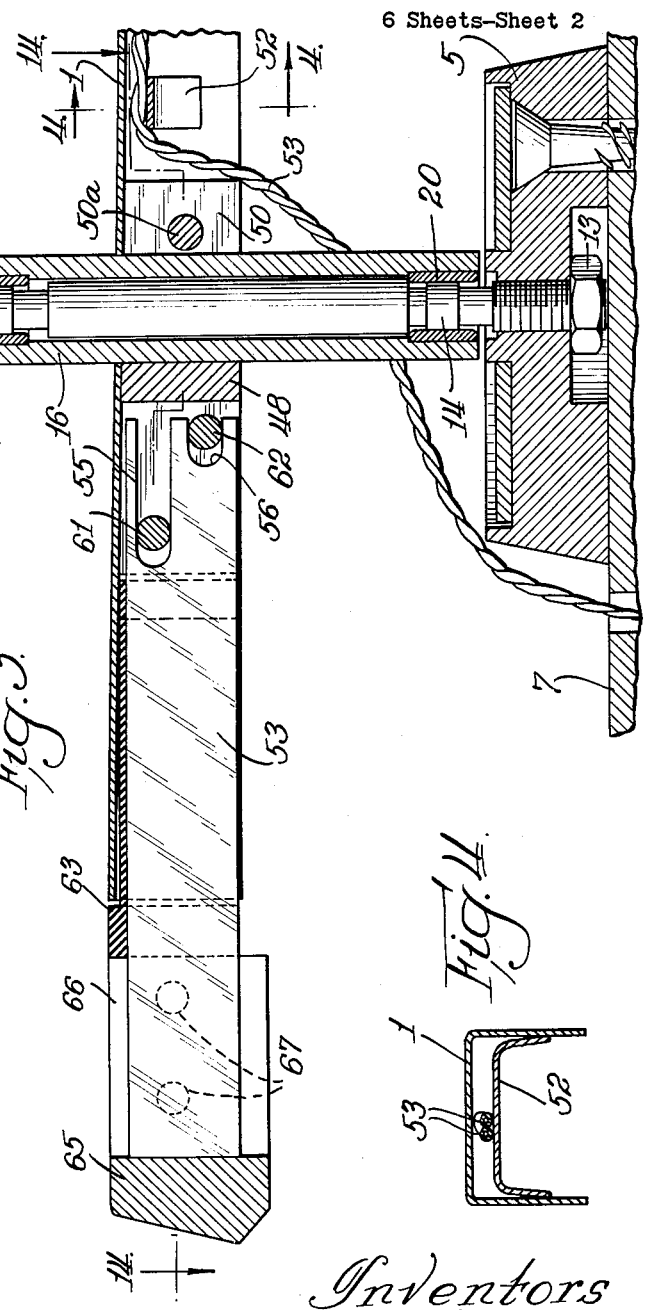

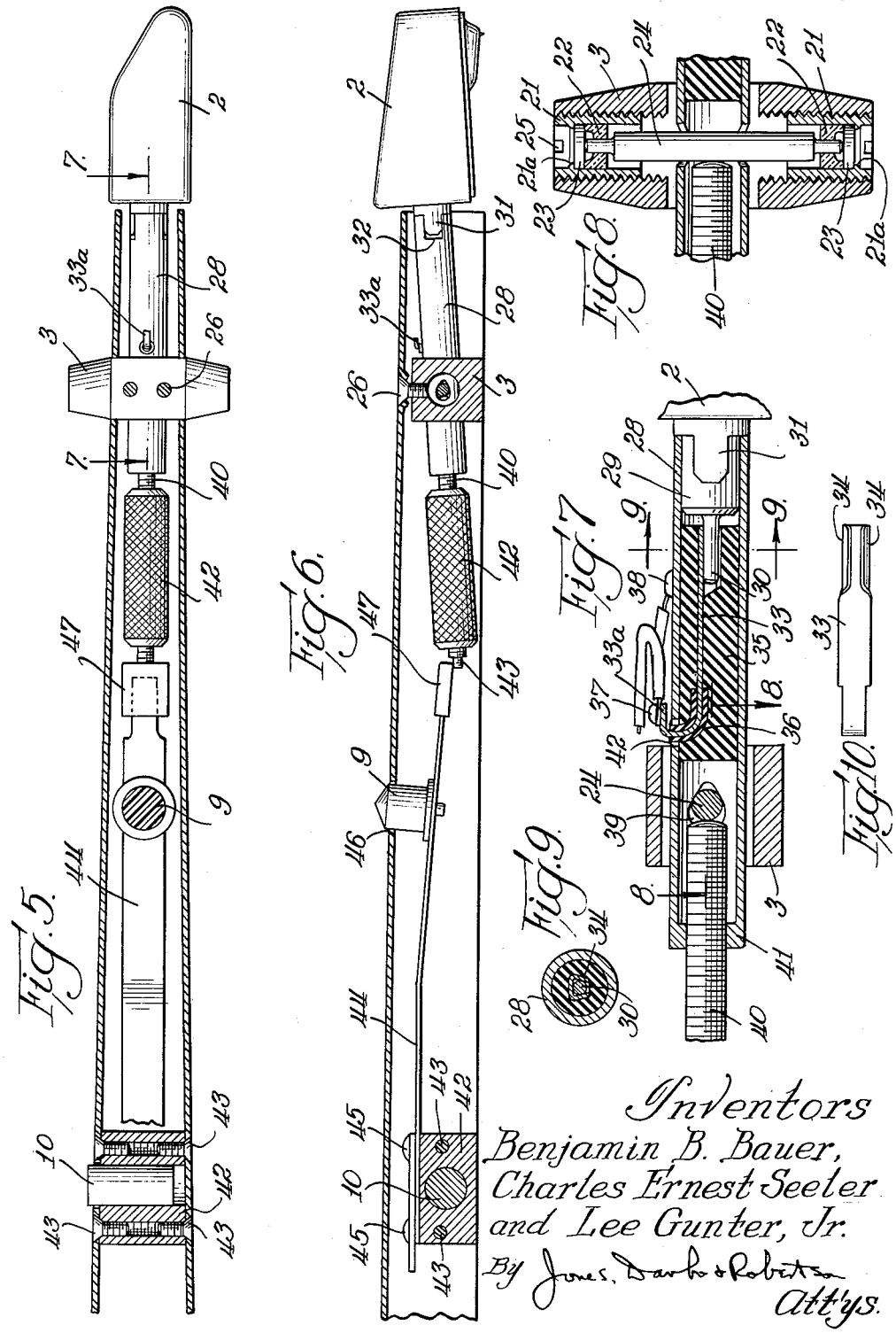

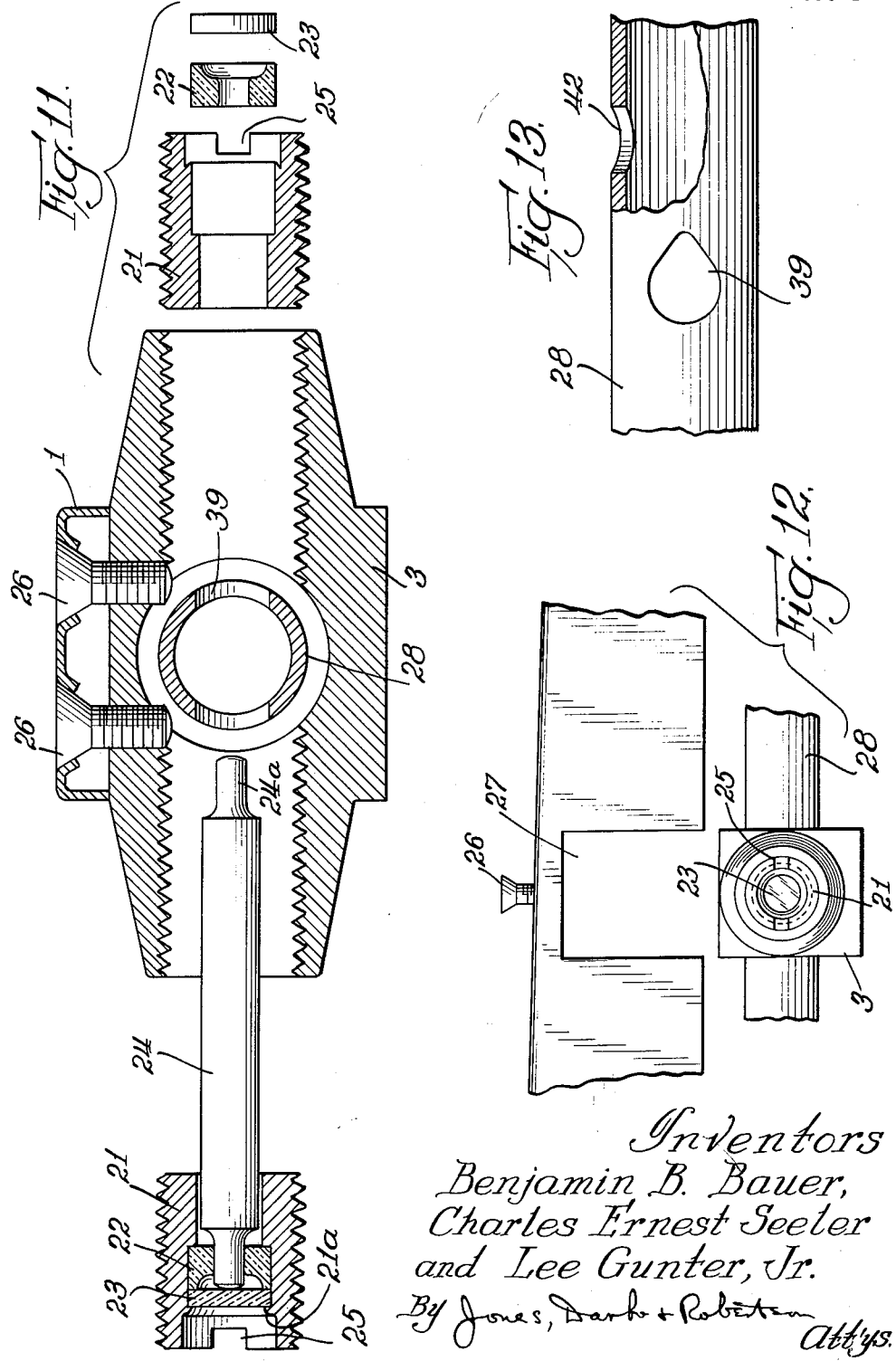

May 9, 1961 B. B. BAUER ET AL 2,983,516
HIGH FIDELITY TRANSCRIPTION TONE ARM
Filed Feb. 5, 1958 6 Sheets-Sheet 5
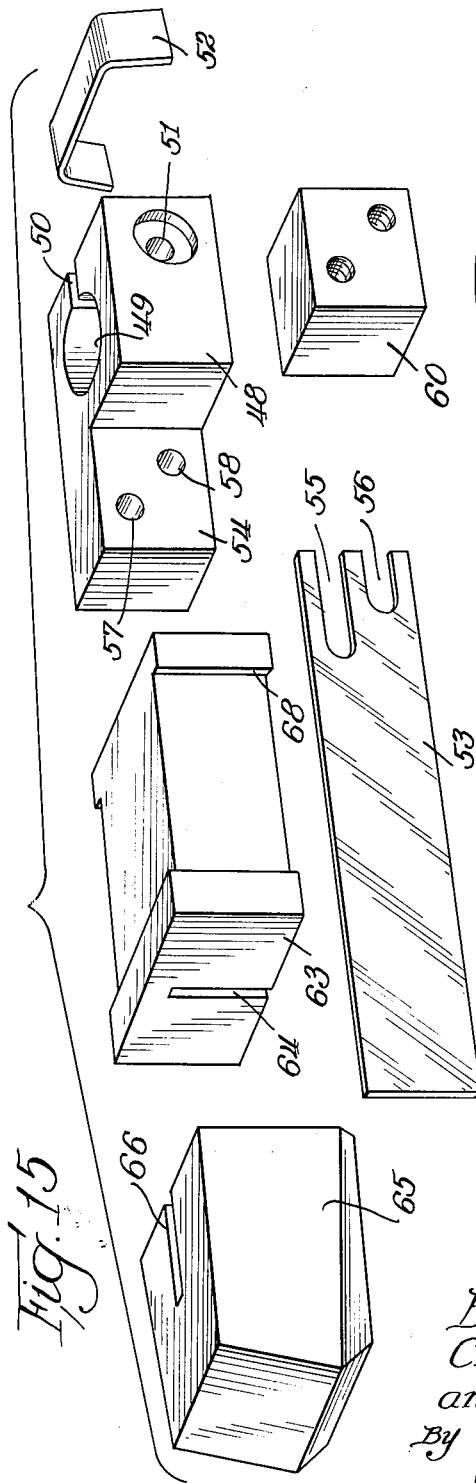
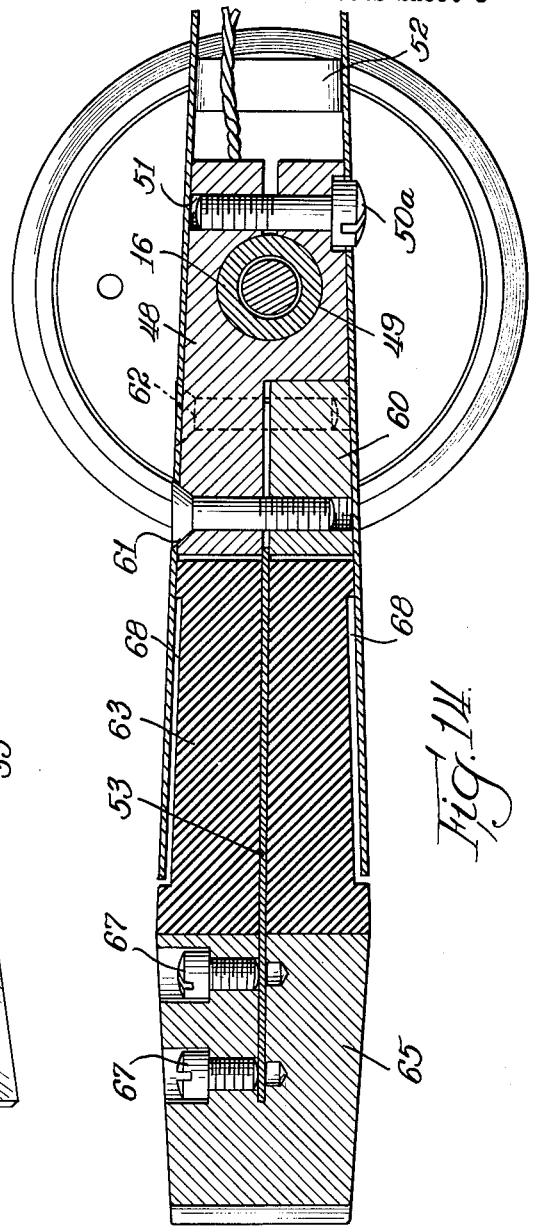
Inventors
Benjamin B. Bauer,
Charles Ernest Seeler
and Lee Gunter, Jr.
By Jones, Davis & Robertson
Attys.

Inventors
Benjamin B. Bauer,
Charles Ernest Seeler
and Lee Gunter, Jr.

– – –

United States Patent Office 2,983,516
Patented May 9, 1961

2,983,516
HIGH FIDELITY TRANSCRIPTION TONE ARM

Benjamin B. Bauer, Stamford, Conn., and Charles E. Seeler, Chicago, and Lee Gunter, Jr., Mount Prospect, Ill., assignors to Shure Brothers Incorporated, Evanston, Ill.

Filed Feb. 5, 1958, Ser. No. 713,436

6 Claims. (Cl. 274—23)

This invention relates to the reproduction of recorded sound and more particularly refers to a tone arm suitable for use with modern high fidelity pickup cartridges for high fidelity reproduction.

During recent years, the development of the modern high quality long playing microgroove record has spurred the development of pickup cartridges capable of reproducing the sound of the recordings with almost the same degree of fidelity with which the records were recorded. Cartridges have now been developed which are light, sensitive, and can reproduce recorded sound over a wide frequency range and with a high degree of fidelity. The mechanical systems of these cartridges have a very high degree of compliance and are capable of satisfactory operation at very low stylus forces. One such pickup cartridge is disclosed in copending application Serial No. 651,404 for Magnetic Phonograph Pickup, filed April 8, 1957, and assigned to the assignee of the present application, wherein is described a cartridge with a stylus and magnetic armature assembly having low mass, a high degree of compliance, and capable of operation at stylus forces of two grams or less.

The rapid progress in the development of pickup cartridges has greatly outdistanced the development of tone arms to support the cartridges. There are a number of requirements for a tone arm that is satisfactory for use with the best of the modern high fidelity cartridges, which requirements have not been fully met by the tone arms now available. In the first place, the mass of the arm must be reduced to a minimum, and, together with the cartridge, perfectly balanced to avoid excessive sensitivity to both motorboard or floor vibrations which would tend to cause the pickup to "jump the groove." Second, the tone arm should be properly damped to reduce low frequency hang-over and accentuation of rumble. Third, since the human touch is not sensitive to forces as small as one or two grams, a means is advantageously provided for placing the stylus on the record under complete control. Finally, since low stylus forces are used and since the grooves of modern microgroove records are very small, the arm must be practically devoid of frictional forces which would prevent free traverse of the needle across the record and free vertical movement of the stylus.

It is an object of this invention to provide a tone arm capable of operating with a high fidelity pickup cartridge using a stylus force of two grams or less.

It is another object to provide a tone arm whose lateral and vertical movements are almost completely free from friction.

It is a further object to provide a tone arm whose mass may be balanced.

It is a further and particularly important object to provide a tone arm which has damping means for the prevention of resonant vibration within the tone arm.

It is still further an object to provide a tone arm having a means for raising and lowering the pickup cartridge for placing the stylus on a record where stylus forces in the range of one to two grams are used.

Other objects and advantages of the present invention will become apparent from the following description and drawings in which:

Fig. 2 is a cross-sectional view taken at line 2—2 of Fig. 1 and showing the lifting mechanism for the pickup cartridge;

Fig. 3 is a cross-sectional view, on enlarged scale, taken at the line 3—3 of Fig. 1 and showing the vertical pivot mounting mechanism of the tone arm;

Fig. 4 is a cross-sectional detail view taken at the line 4—4 of Fig. 3;

Fig. 5 is a cross-sectional view taken at the line 5—5 of Fig. 2;

Fig. 6 is a cross-sectional view similar to that of Fig. 2 but showing the pickup cartridge in raised position;

Fig. 7 is a detail view in cross-section taken at the line 7—7 of Fig. 5;

Figs. 8 and 9 are detail views in cross-section taken, respectively, at the lines 8—8 and 9—9 of Fig. 7;

Fig. 10 is a bottom view of the socket terminal for connection of the pickup cartridge;

Fig. 11 is an exploded view, in cross section, showing the details of the horizontal pivot support of the pickup cartridge lifting mechanism;

Fig. 12 is a side view showing the manner in which the cartridge lifting pivot support is assembled into the tone arm;

Fig. 13 is a detail view, partly in section, of the pickup cartridge supporting arm;

Fig. 14 is a horizontal cross-sectional view of the rear end assembly of the tone arm taken at the line 14—14 of Fig. 3;

Fig. 15 is an exploded view showing the principal structural elements illustrated in cross section in Fig. 14; and Figs. 16-19 are analytical charts and equivalent circuits of the tone arm vibration conditions.

Figure 1:
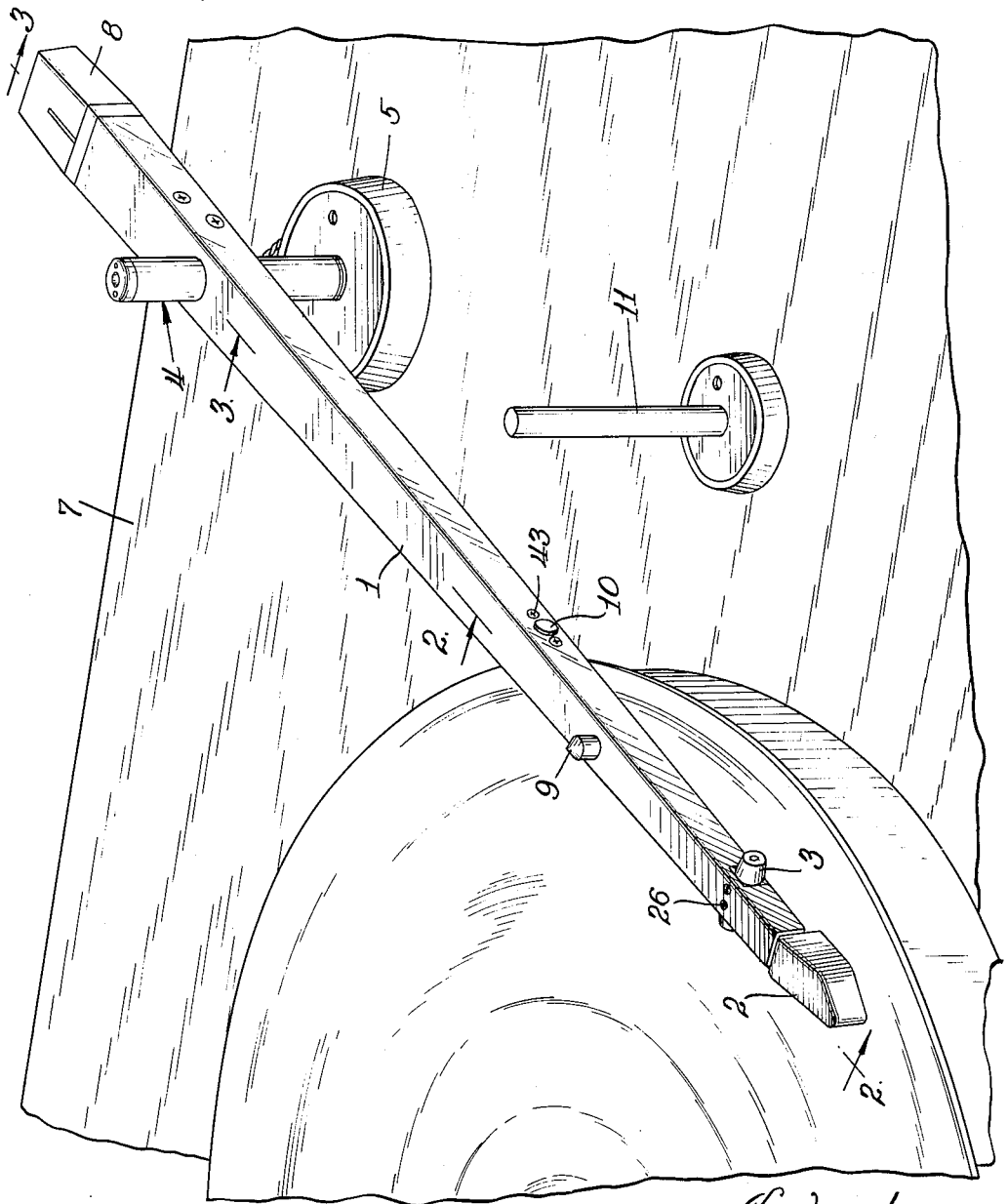
Fig. 1 is a perspective view showing the high fidelity tone arm mounted in operative position with associated phonograph apparatus.

Referring to Fig. 1 of the drawings, the tone arm of the present invention is shown mounted in position for playing a record on the turntable. The tone arm comprises a main body 1 in the form of a tapered channel. Carried by the narrow end is the cartridge 2. The cartridge assembly is pivotally mounted by means of the horizontal bearing assembly at 3. The tone arm is supported by the vertical pillar bearing assembly 4 which allows the arm to move only in a horizontal plane. The vertical bearing assembly is supported by the base 5 which is affixed to the mounting board 7. The tone arm is counterbalanced by an adjustable counterbalance weight 8. The pickup cartridge is raised by the pressing of stylus control button 9. A magnet 10 is positioned in the tone arm and maintains the tone arm in fixed position against the vertical tone arm rest 11 when the arm is not in use.

The main vertical pillar bearing assembly is illustrated in detail in Fig. 3. Here the main pivot shaft 12 is affixed to the supporting base 5 by means of screw threads and locked by a nut 13. The shaft is machined to provide two reduced bearing surfaces 14 and 15. The arm is affixed to the pillar sleeve 16 which rotates upon the shaft 12. The pillar sleeve is supported by means of a convex ruby pivot thrust bearing 17 which operates against the polished top end of the steel shaft 12. The ruby bearing is maintained in position by the screw cap housing 18 which is screwed into the sleeve. For horizontal support the sleeve contains two oilite bearings 19 and 20 which maintain almost frictionless contact against bearing surfaces 14 and 15. The shaft 12 is so dimensioned that there is no contact between it and the sleeve except at the bearing surfaces.

The horizontal bearing assembly supporting the pickup cartridge and the cartridge lifting mechanism is housed within bearing housing 3 which is mounted in the tone arm by means of screws 26. As is shown in detail in Figs. 8 and 11, a horizontal pivot shaft 24 is journaled at its reduced ends 24a in jewel bearings held in sleeves 21 which are screwed into the ends of housing 3. Each jewel bearing, designed for minimum friction, includes a sapphire ring jewel 22 and a ruby end stone 23. These elements are assembled within sleeves 21 and held in place by swaging metal of the sleeves over the peripheries of end stones 23, as shown at 21a. Clearance between the shaft end bearing surfaces and the ruby end stones are adjusted by turning threaded sleeves 21, as by means of a screw driver inserted into opposite notches 25. The ends of the housing extend through slots 27 provided in the side walls of the tone arm.

The cartridge and cartridge counterbalance assembly are supported upon opposite ends of a tube 28 which is mounted on shaft 24 for pivotal movement in a vertical plane. The forward end of tube 28 serves as a socket to receive the cartridge plug which is comprised of a cylindrical cartridge terminal 29 and a prong 30 which forms the other terminal for the cartridge. Ridges 31 are provided on terminal 29 to slide into slots 32 provided in the end of tube 28 to orient the cartridge in the proper playing positions. Cylindrical cartridge terminal 29 fits snugly into the end of tube 28 to establish electrical contact between these elements as well as support for the cartridge. Electrical contact is made with the prong terminal by a brass spring connector 33 which is shown separately and in Fig. 10. This connector element has wings 34 which are bent to form a socket to receive the center prong of the cartridge in a tight slidable fit. The connector 33 is supported within the sleeve 28 by insulating material 35 which prevents the center contact from shorting out against the sleeve, which, as stated above, is connected with the other cartridge terminal member. The rearward end of the connector leads upwardly and emerges through a hole 42 in tube 28 and forms exposed terminal 33a, this rear end portion of the connector being surrounded by an insulating sleeve 36 which prevents its shorting against the tube 28 as it emerges through the hole therein. The terminal 33a is provided with a terminal screw 37 for connecting the terminal with one of the leads going to the preamplifier. The tube 28 is connected by another contact terminal screw 38 to the other wire leading to the preamplifier.

For the purpose of mounting tube 28 upon pivot shaft 24, a pair of teardrop-shaped openings 39 are provided in the walls of the tube. Shaft 24 passes through these openings and is fixed therein by means of threaded shaft 40 which is screwed into a threaded rear end portion 41 of tube 28 to force shaft 24 tightly against the converging sides of openings 39.

A knurled cartridge counterweight 42 is adjustably threaded onto the exposed portion of shaft 40, and the rearward end of this shaft is flattened, as at 43, for engagement with the cartridge lift control mechanism.

The cartridge lift mechanism comprises a supporting block 42 which is fixedly mounted between the sides of the arm 1 by means of screws 43. A leaf spring 44 is fastened to the top of the block 42 by means of screws 45. A lifter knob or button 9 is affixed to the leaf spring and protrudes through a hole 46 in the top of the arm. At the end of the leaf spring is affixed a contact pad 47 which engages the flattened portion of the end of shaft 43. The spring 44 is flexed so that it normally remains in the upper position shown in Fig. 2 with pad 47 out of contact with shaft 40. Other springing means such as laterally flexible rods or coil springs may be used in place of leaf spring 44.

A magnet 10 is conveniently mounted in block 42 for projection; or at least exposure at the side of the tone arm to hold the arm against post 11 when the phonograph is not in use.

The tone arm counterweight and dynamic damping assembly are shown in Figs. 3, 4, 14, and 15 and comprise a clamping block 48 in which is provided a hole 49 for receiving pillar sleeve 16. A channel 50 is provided leading from the hole to the end of the block, imparting resilience to the part of the block clamping around the vertical pillar sleeve. A hole 51 is provided for a clamping screw 50a to tighten the block about the pillar sleeve. A leaf spring 53, or other spring means such as a laterally flexible rod or coil spring, is provided at one end with a pair of spaced horizontal slots 55 and 56, and this end of the spring is clamped to face 54 of block 48 by means of a two-holed nut 60 and screws 61 and 62 passing through holes 57 and 58 in block 48. This leaf spring supports both a damping block 63 and a tone arm counterbalance 65. The latter may be made of any suitable material, such as metal and is slotted at 66 to receive the free end of leaf spring 53 to which the counterbalance is fastened by fillister screws 67.

Abutting counterweight 65, the damping body 63 is carried upon the middle portion of the leaf spring. This damping body is composed of a viscous elastomeric material, for example, the cellulose nitrate plastic sold under the trademark "Pyralin," No. X2450. Since there is no necessity for the damping block to be movable along the supporting leaf spring, it may be molded directly thereon or, generally more conveniently, the block may be preformed with a slot 64 to receive the spring and cemented to counterweight 65 and/or to the leaf spring. Shallow channels 68 are provided in the sides of damping block 63 to permit limited lateral vibration of the counterweight and damping assembly between the sides of the tone arm.

A U-shaped brace 52 is affixed to the sides of the tone arm, providing a support for the lead wires 53.

To provide the tone arm and cartridge assembly for operation the cartridge is plugged into the socket provided in the end of tube 28. The stylus force is adjusted to the desired value, generally between one and two grams, by turning the knurled cartridge counterbalance weight 42 until the desired value is obtained.

Since the human hand is not sensitive enough to provide accurate and steady manipulation of forces as small as one to two grams, special provision is made for raising and lowering the cartridge. The leaf spring 44 is biased to apply an upward force of about ten to fifteen grams at control button 9. In order to lift and lower the cartridge, the finger must provide a force of the magnitude of eleven to seventeen grams a force to which it is sensitive. The stylus control button is located near the free end of the tone arm so that the cartridge may be lifted and the arm swung about merely with one finger. As the finger is raised, the button and leaf spring move upwardly to their normal position, allowing the cartridge and stylus to be lowered to the record groove.

The horizontal pivot shaft 24 is provided with bearing journals which are machined to a tolerance of about .0001 inch, and this space is filled with a film of lubricant. This provides a sturdy, durable, frictionless pivot which is practically indestructible and which, when properly adjusted, has no play whatever. The bearings are mounted in a single machined housing 3 so that accurate alignment is permanently maintained. Similarly, the tone arm support vertical pillar is provided with jeweled bearings to afford a freedom of motion to the arm which allows for proper tracking even at the extremely low stylus force used. Additionally, since the tone arm is balanced by the counterbalance weight 65 practically no force is imposed on the oilite bearings except when the cartridge is lifted, and friction and bearing wear are practically nonexistent.

It has been known that undesirably large forces may be developed between the grooves of the stylus and the mass of the tone arm when the later tends to vibrate in resonance with the stylus. This causes considerable distortion in normal reproducing systems, but is even more serious in systems employing highly sensitive reproducers using low stylus forces. To avoid this source of distortion, a novel method has been developed in the present tone arm to provide dynamic damping of any vibration therein. This is accomplished by floating the arm counterweight 65 on the leaf spring 53 and embedding the leaf spring in the viscous elastomeric body 63.

Figure 16:
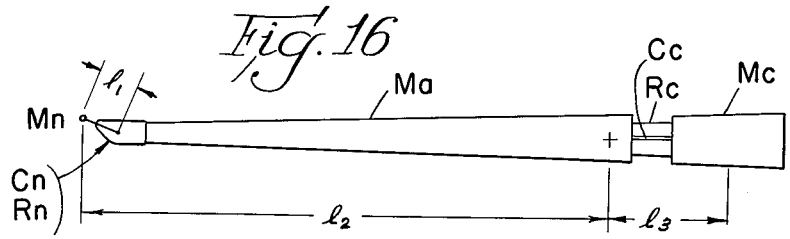
Figure 17:
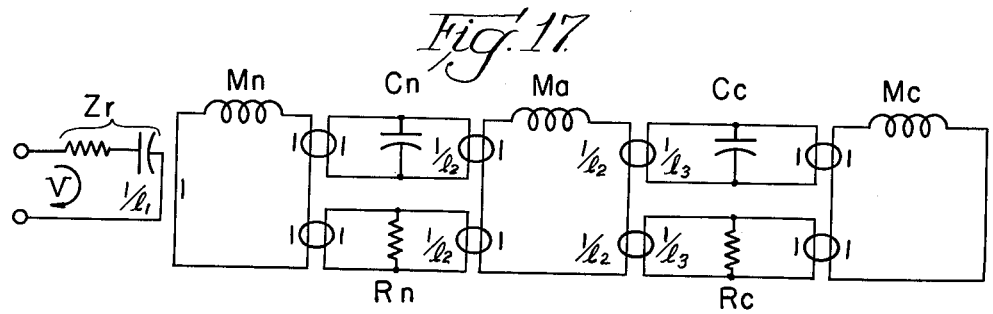
Figure 18:
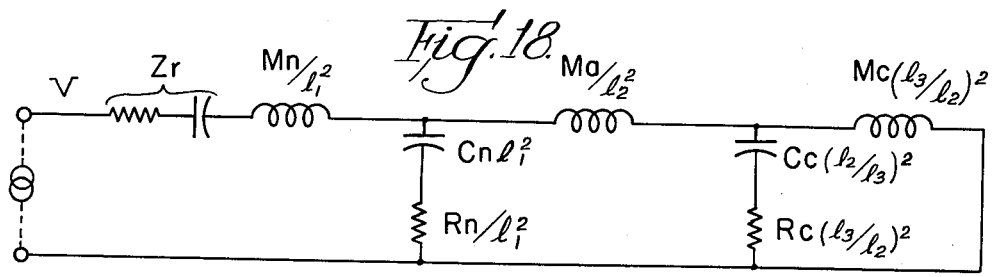

The effect of tone arm resonance and the elimination thereof by the present invention may be clearly demonstrated analytically by translating the mechanical force produced in the tone arm to its equivalent electrical circuit. The analogy of the mechanical and electrical equivalents are shown in Figs. 16, 17 and 18. Referring to Fig. 16, the elastic contact between the stylus and the record will exhibit an impedance, $Z_r$. The moment of inertia of the needle-magnet system of the pick-up cartridge is equivalent to a mass $M_n$. The torsional compliance and damping of the stylus bearings connecting the stylus to the cartridge is shown as $C_n R_n$. The moment of inertia of the tone arm around the vertical pivot is given by $M_a$. The torsional compliance and damping of the arm counterweight spring is given by $C_c$ and $A_c$, and the moment of inertia of the arm counterweight around the vertical shaft is $M_c$.

To visualize the equivalent electrical circuit, the ideal transformer analogy as shown in Fig. 17 may be used. For experimenting with equivalent circuits, the transformer may be removed by appropriate multiplication of impedances by lever ratios squared, obtaining the equivalent circuit shown in Fig. 18. It is evident that if the reactance of $C_c$ and resistance $R_c$ are infinite, as in a conventional arm, then the parallel circuit formed of $C_n$ and $M_a + M_c$ will define a high impedance at resonance, and undue forces may be developed across the stylus and the record. If $C_c$ is finite, and $R_c$ is zero, then there will be a double resonance because of the two degrees of freedom of the system. However, by proper choice of damping, the resonance will be effectively eliminated and the arm will exhibit a damped characteristic. Although in the present tone arm this resonance takes place below 20 c.p.s., damping is still important for hangover elimination and to minimize rumble components.

Figure 19:
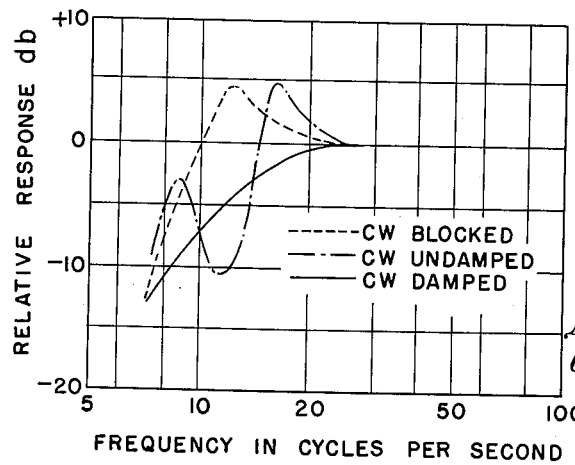

Fig. 19 shows curves exhibiting the three modes of performance described above. The dash line shows the response with the leaf spring 33 blocked so that the arm behaves effectively as a single spring-mass system without damping. The dot-dash line shows the performance with the counterweight 65 unblocked and undamped, exhibiting a double resonance. The solid line shows the frequency response with the counterweight suitably damped by means of the damping block 63 and the spring 53 as described herein, providing a smooth curve.

The tone arm of the present invention meets all of the requirements for a very sensitive high fidelity tone arm. It is so perfectly balanced and suspended on such low friction bearing that the low stylus forces of the most advanced pickup cartridges may be utilized with excellent tracking. The difficulty encountered with tone arms disclosed in the art of delicately handling the extremely small stylus forces have been eliminated by the improved cartridge lifting means. Finally, the distortion caused by the tone arm resonance which is so detrimental to the sound reproduced by an extremely sensitive pickup has been eliminated by the novel damping means disclosed.

Improved convenience of operation has also been provided by the insertion of a small cylindrical magnet in the tone arm. When the arm is not in use it may be swung to meet the vertical arm rest pillar 11 where it will be held by the attraction of the magnet for the arm rest.

Because of the geometrical configuration of the tone arm, it is light, rigid, and free from self resonance. The arm may be made straight rather than angled or curved, since as described in the application mentioned above the stylus itself is positioned at the proper tracking angle in the cartridge.

Invention is claimed as follows:

1. In a phonograph tone arm including an arm pivotally mounted on a stationary pillar for movement solely in a substantially horizontal plane, the improvement which comprises in combination a pickup cartridge supporting, counter-balancing and lifting assembly arranged in the forward portion of said arm, said assembly comprising a shaft pivotally mounted on said arm allowing movement solely in a vertical plane, the forward end of said shaft having pickup cartridge supporting means and the rearward end of said shaft carrying an adjustable counterweight, a spring means affixed at one end to said arm for flexing in a vertical plane, exposed means for manually depressing the free end of said spring means, said spring means being biased upwardly and so arranged that the free end thereof engages the rearward end of said shaft when said spring means is depressed, whereby to cause said pickup cartridge to be lifted.

2. Structure in accordance with claim 1 wherein said spring means is a leaf spring and the exposed means for manually depressing the leaf spring comprises a button affixed to the top surface thereof and protruding through an opening in the top wall of the arm, whereby said button serves as a knob to lift and lower the cartridge and also to swing the tone arm in rotation about the stationary pillar.

3. Structure in accordance with claim 1 wherein the leaf spring is so arranged that it is normally out of contact with the shaft and engages the latter only upon depression of said leaf spring.

4. In a phonograph tone arm including an arm pivotally mounted on a stationary pillar for movement solely in a substantially horizontal plane and adapted to support at the forward end thereof a pickup cartridge which is pivotally mounted to allow movement solely in a substantially vertical plane, the improvement which comprises means for counterbalancing and damping vibration in said tone arm comprising a spring adjustably affixed at one end thereof to said arm rearwardly of the pivot mounting of said tone arm for flexing in a horizontal plane and extending rearwardly from said arm, a counter-weight affixed to the free end of said spring, and a damping block positioned about the middle portion of said spring in contact engagement with both sides thereof, said tone arm having vertical side wall extensions extending rearwardly beyond the rear end thereof, the forward-most portions only of both sides of said damping block being in contact engagement with said side wall extensions, the remaining portions of both sides of said damping block being spaced apart from said extensions, and the rearward end of said damping block abutting the forward end of said counter-weight, the side wall extensions of said arm extending rearwardly a distance sufficient to maintain the forward-most portions of said damping block in contact engagement with said extensions over the entire adjustment range of said spring, the structure and arrangement being such that flexing of said spring causes distortion of said block for damping vibration of said spring, and the moment of inertia of said vibration damping means remains substantially uniform over the entire adjustment range of said spring.

5. In a phonograph tone arm including an arm pivotally mounted on a stationary pillar for movement solely in a substantially horizontal plane, the improvement which comprises in combination a pickup cartridge-supporting, counter-balancing and lifting assembly arranged in the forward portion of said arm, said assembly comprising a shaft pivotally mounted on said arm allowing movement solely in a vertical plane, the forward end of said shaft having pickup cartridge-supporting means and the rearward end of said shaft carrying an adjustable counter-weight, a spring means affixed at one end to said arm for flexing in a vertical plane, exposed means for manually depressing the free end of said spring means, said spring means being biased upwardly and so arranged that the free end thereof engages the rearward end of said shaft when said spring means is depressed, whereby to cause said pickup cartridge to be lifted, and means for counter-balancing and damping vibration in said tone arm comprising a leaf spring adjustably affixed at one end thereof to said arm rearwardly of the pivot mounting thereof for flexing in a horizontal plane and extending rearwardly from said arm, a counter-weight affixed to the free end of said leaf spring, and a damping block positioned about the middle portion of said leaf spring in contact engagement with both sides thereof, said tone arm having vertical side wall extensions extending rearwardly beyond the rear end thereof, the forward-most portions only of both sides of said damping block being in contact engagement with said side wall extensions, the remaining portions of both sides of said damping block being spaced apart from said extensions, and the rearward end of said damping block abutting the forward end of said counter-weight, the side wall extensions of said arm extending rearwardly a distance sufficient to maintain the forward-most portions of said damping block in contact engagement with said extensions over the entire adjustment range of said leaf spring, the structure and arrangement being such that flexing of said leaf spring causes distortion of said block for damping vibration of said leaf spring, and the moment of inertia of said vibration damping means remains substantially uniform over the entire adjustment range of said leaf spring.

6. Structure in accordance with claim 5 wherein the damping block abuts the counterweight and is bonded thereto.

References Cited in the file of this patent

UNITED STATES PATENTS

| | | |
|---|---|---|
| 2,060,117 | Proctor | Nov. 10, 1936 |
| 2,324,214 | Kellogg | July 13, 1943 |
| 2,329,526 | Germeshausen | Sept. 14, 1943 |
| 2,357,034 | Thompson et al. | Aug. 29, 1944 |
| 2,375,658 | Johnson | May 8, 1945 |

FOREIGN PATENTS

| | | |
|---|---|---|
| 260,626 | Switzerland | Aug. 1, 1949 |
| 417,927 | Great Britain | Oct. 8, 1939 |
| 659,644 | Great Britain | Oct. 24, 1951 |